United States Patent Office 2,896,661
Patented July 28, 1959

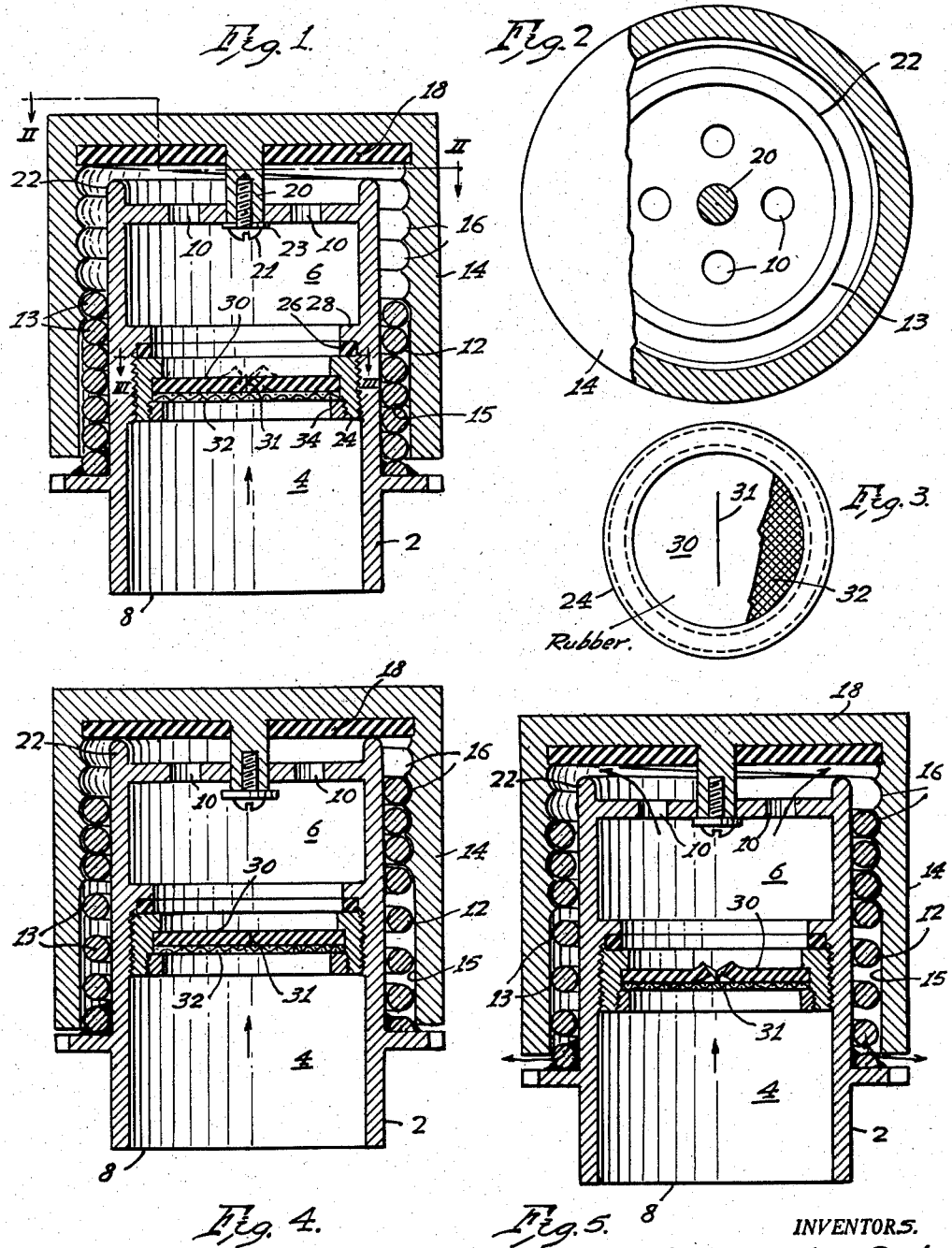

2,896,661

PRESSURE RELIEF VALVE

Earl M. Becker, Pittsburgh, and John J. Bridge, Turtle Creek, Pa., assignors to Mine Safety Appliances Company, Pittsburgh, Pa., a corporation of Pennsylvania Application January 3, 1955, Serial No. 479,488

6 Claims. (Cl. 137—512.3)

This invention relates to valves and more particularly to the type used for relieving fluid pressure and which are commonly referred to as pressure relief valves.

It is an object of this invention to provide a pressure relief valve which is sensitive to fluid pressures over a wide range.

It is a further object of this invention to provide a pressure relief valve which operates to relieve fluid pressures at a very low value and which may be adjusted to relieve pressures of fluids through a range of successively higher values.

Another object of this invention is to provide a pressure relief valve having means which will release low pressure fluids at a predetermined constant value and having means for adjustably releasing successively higher pressure fluids.

A further object of this invention is to provide a pressure relief valve of general utility and which is particularly useful in self-contained underwater breathing apparatus.

A further object of this invention is to provide a pressure relief valve, the production of which is simple and contains parts which are easily and inexpensively replaced and which may readily be manipulated for adjusting release of fluid pressures throughout the entire range of valve adjustment.

According to the present invention, the pressure relief valve comprises a housing forming an inlet chamber and an outlet chamber and having a valve seat adjacent the outlet chamber. A helical spring is aranged concentrically with the outside of the valve housing with its lowermost coils permanently attached to the housing. A threaded valve head or closure cap, having threads of a dimension to engage the coils of the spring, is screwed onto the helical spring for adjustably closing the outlet chamber by engaging the cap and seat to thereby open and close communication between the outlet chamber and the surrounding medium. The spring holds the cap against the seat but yields under fluid pressure. A flat, low pressure, rubber disc valve is operatively associated with a screen disc and both elements are interposed between the inlet and outlet chambers of the valve housing to permit fluid to pass from the inlet chamber into the outlet chamber and which opposes reverse flow of this fluid. The low pressure disc valve and screen may be removed if only release of high pressure fluid is desired.

Further objects and advantages will become apparent from the following detailed description and accompanying drawing in which:

Fig. 1 is a vertical sectional view of the relief valve showing the closure cap open for release of low pressure fluid;

Fig. 2 is a horizontal sectional view taken on line II—II of Fig. 1;

Fig. 3 is a horizontal plan view of the low pressure rubber disc valve with parts broken away and taken on line III—III of Fig. 1;

Fig. 4 is a vertical sectional view of the relief valve showing the closure cap in an adjusted closed position for relieving fluid pressures; and Fig. 5 is a vertical sectional view of the relief valve showing various components in operation as fluid pressure is relieved.

The pressure relief valve of this invention is shown as comprising a cylindrical housing 2 forming an inlet chamber 4 and an outlet chamber 6. The bottom of housing 2 forms an inlet opening 8, and the top of the housing forms an outlet opening composed of apertures 10 extending over outlet chamber 6. A relatively heavy helical spring 12 having coils 13 is concentrically disposed around the lower part of housing 2 with the lowermost coils permanently attached to the housing by welding, soldering or the like. Spring 12 is normally compressed and yields in response to the various fluid pressures for which the valve may be adjusted. A valve head or closure cap 14 is partially threaded by threads 16 and is threadedly connected to coils 13 for concentric relationship therewith. The side wall portion of cap 14 having a blank inner surface 15 extends downwardly and around spring 12 to lend lateral stability to the cap and provides a protective casing for the spring 12. Also, cap 14 with its side wall portion prevents foreign particles from entering chambers 4 and 6. A resilient gasket 18 is press-fit into the top of closure cap 14 and contains a central opening receiving a stud 20 depending centrally from closure cap 14. Stud 20 is internally threaded to receive a bolt 21 and complementary washer 23. The uppermost portion of housing 2 comprises an upstanding annular seat 22 upon which gasket 18 is seated when the closure cap is turned down on spring 12 as can be readily seen in Fig. 4. Washer 23 limits the upward movement of closure cap 14 to prevent accidental dislodgement of the cap when fluid pressures are exerted on gasket 18 against the tension of spring 12.

Interposed between inlet chamber 4 and outlet chamber 6 is a low pressure valve assembly comprising an annular housing 24 threadedly connected to housing 2. Annular housing 24 is turned up tightly against a resilient ring gasket 26 abutting an integral flange 28 of housing 2. A rubber disc valve 30 having a slit 31 located medially thereof is disposed within housing 24 and is superimposed on a circular screen 32. Both valve 30 and screen 32 are retained within housing 24 by an annular locking ring 34 threadedly connected within annular housing 24. Screen 32 permits slit 31 to open upwardly to pass fluid through valve 30 into outlet chamber 6 but restrains the opening of slit 31 downwardly for preventing the passage of fluid from chamber 6 to inlet chamber 4. Accordingly, valve 30 and screen 32 function as a one-way valve to permit fluid flow in one direction only.

Noting particularly Fig. 1, it is seen that the closure cap 14 is threadedly connected to only the uppermost coil of spring 12 permitting gasket 18 to be spaced from seat 22 to thus provide an exit passage for fluids seeking escape from outlet chamber 6. As shown, the pressure relief valve is adjusted for functioning to relieve low pressure fluid only through rubber disc valve 30, and it accomplishes this pressure relief at a constant value since slit 31 is precalibrated and nonadjustable to open at a single predetermined value of fluid pressure. When the fluid in inlet chamber 4 reaches the pressure at which slit 31 will open, the fluid passes through slit 31, into chamber 6, through apertures 10, between gasket 18 and seat 22, downwardly across the coils 13 and out under the lower edge of closure cap 14 into the surrounding medium. Spring 12 and closure cap 14 are inoperative as far as pressure relief is concerned when positioned as shown in Fig. 1, so that only low pressure fluids are effective.

When it is desired that pressure relief be accomplished at pressures higher than those required to open valve 30, closure cap 14 is turned down on spring 12 to threadedly engage additional coils 13 (Fig. 4) until gasket 18 is seated on seat 22 to thus oppose passage of fluid attempting to escape from outlet chamber 6. When cap 14 is seated, each additional coil received by a thread 16 produces further separation of the remaining coils not threadedly received to increase the restoring force exerted by the spring. Thus, as more coils 13 are threadedly engaged by threads 16, the tension of spring 12 will increase to resist greater fluid pressures. The uppermost limit of the relief valve is reached, of course, when all threads 16 are engaged by coils 13. That is, when cap 14 is turned down to the point where no threads are available for reception of coils 13, spring 12 is expanded to its effective limit for ultimate fluid pressure release. Noting Fig. 5, when the fluid pressure at which the closure cap 14 will open has been reached, gasket 18 will move away from seat 22 as shown in Fig. 5 against the tension of spring 12 to permit escape of the fluid from outlet chamber 6 into the surrounding medium. The directional arrows shown in Figs. 1, 4 and 5 indicate the path of fluid from inlet passage 8 to the medium surrounding the pressure relief valve.

In some instances, it is desirable to use only the high pressure stage of the pressure relief valve, and, accordingly, the relief valve may be readily adapted to such use by merely removing housing 24 from housing 2 which also removes valve 30, screen 32 and retaining ring 34.

All components of the instant valve are formed of materials which are highly resistant to water damage in order that the valve may be submerged in liquids, such as water, as in the case when the valve is used in conjunction with underwater self-contained breathing apparatus.

To illustrate the use of the relief valve of the present invention, its function will be described in connection with self-contained breathing apparatus of the underwater type. Such apparatus, for example, normally includes a breathing bag being supplied with breathable air from an oxygen cylinder and rebreathable air cleansed by a carbon dioxide absorbent canister. The diver breathes this breathable air through hoses connected between the breathing bag and a face mask. The pressure relief valve hereinabove described can be mounted on the breathing bag to release or dump excessive fluid pressures in order that the apparatus and/or the diver's lungs are not damaged. Referring to the drawing, housing 2 with its inlet opening 8 would be mounted in some convenient manner in fluid communication with the breathing bag. Normally, the diver would require that the breathing bag relieve fluid pressures of the order of 12 inches of water; therefore, valve 30 would be precalibrated to open at this pressure, and cap 14 would be adjusted to engage spring 12 as is shown in Fig. 1. That is, the relief valve would be set for low pressure operation only. It may become a necessity, however, to operate the valve at a pressure where fluid release is higher than 12 inches of water as, for example, where the diver does not desire to have his position detected by air bubbles issuing from the valve as fluid pressures in the bag increase beyond 12 inches of water. In these circumstances, the diver could merely tighten cap 14 to threadedly engage more coils 13 of spring 12 as is shown in Fig. 4. When this setting is accomplished by the diver, fluid would not be released by the valve until pressures of from 3 to 5 pounds per square inch, for example, are obtained, permitting him to safely stay submerged without detection from surfaced air bubbles. Concurrently, the relief valve will still open if the apparatus pressurizes to a danger point. It is to be clearly understood that the foregoing pressures mentioned are merely illustrative to show how the valve can be used and should not be construed as limiting the pressures at which the valve will dump fluids. The valve 30 may conveniently release fluid pressures from slightly above zero inches of water to approximately 15 inches of water, and valve head 14 may be adjusted to release fluid from 15 inches of water to pressures greatly exceeding 15 pounds per square inch.

From the above description, it is readily seen that the present invention provides a pressure relief valve which is sensitive to fluid pressures over an exceptionally wide range and is responsive to low fluid pressure release and adjustable to respond to successively higher pressures. Further, the valve may be easily and inexpensively produced and contains parts which are small in number and rugged in construction.

Having explained the principle of the present invention and having illustrated and described what is considered to be the best embodiment, it is to be understood that, within the scope of the appended claims, the invention may be practiced otherwise than as specifically illustrated and described.

We claim:

1. A pressure relief valve comprising a housing forming communicating fluid inlet and outlet chambers, a valve seat formed on the end of said housing around said outlet chamber, a coil spring surrounding and attached at one end to said housing, a rotatable valve head having a side wall being spaced from the housing and open at its lower end to provide a continually open fluid passage therebetween, and arranged concentrically with said spring and having threads receiving the unattached coils of said spring, said head engaging said seat to close said outlet chamber when said head is adjustably threaded on said spring, said spring controllably holding said head closed against said seat but yielding at predetermined fluid pressures to disengage the head and seat.

2. A pressure relief valve comprising a cylindrical housing having inlet and outlet openings with a fluid passage extending between said openings; a valve seat formed on the end of said housing at said outlet opening; a coil spring disposed concentrically around said housing and having at least one coil attached to the housing; motion limiting means extending across said outlet opening; a rotatable closure cap slideably attached to said means; said closure cap concentrically surrounding at least part of said spring and having threads to receive unattached coils of said spring; said cap engaging said seat when adjustably threaded on said spring to close said outlet opening; and said spring holding said cap controllably closed against said seat but yielding at predetermined fluid pressures to disengage the cap from the seat.

3. A pressure relief valve comprising a cylindrical housing having inlet and outlet openings with a fluid passage extending between said openings, a valve seat formed on the end of said housing at said outlet opening, a coil spring disposed concentrically around said housing and having at least one coil attached to the housing, a cylindrical closure cap having a side wall and only one end wall, said side wall concentrically encasing said spring and having threads receiving the unattached coils of said spring, said end wall engaging said seat to close said outlet opening when said side wall is adjustably threaded on said spring, said side wall being spaced from the housing to provide a continuously open fluid passage therebetween, and said spring holding said cap controllably closed against said seat but yielding at predetermined fluid pressures to disengage the end wall from the seat.

4. A pressure relief valve comprising a housing forming communicating fluid inlet and outlet chambers, a valve seat formed on the end of said housing around said outlet chamber, a coil spring surrounding and attached at one end to said housing, a rotatable valve head having a side wall arranged concentrically with said spring and having threads receiving the unattached coils of said spring, said head engaging said seat to close said outlet chamber when said head is adjustably threaded on said spring, said side wall being spaced from the housing and open at its lower end to provide a continually open fluid passage therebetween, said spring controllably holding said head closed against said seat but yielding at predetermined fluid pressures to disengage the head and seat, and a valve means connected inside said housing and normally closing fluid communication between said chambers but opening in one direction only under fluid pressure.

5. The combination as defined in claim 4 and said valve means comprising a flexible disc positioned across said housing, said disc having a slit and operatively cooperating with means to pass fluid in the direction of said outlet chamber only.

6. The combination as defined in claim 4, and said valve means comprising a flexible disc and screen, said disc having a slit and being superimposed on said screen to pass fluid in the direction of said outlet chamber only.

References Cited in the file of this patent

UNITED STATES PATENTS

| | | |
|---|---|---|
| 821,624 | Edison | May 29, 1906 |
| 1,238,779 | Johnson | Sept. 4, 1917 |
| 1,644,783 | Lissel | Oct. 11, 1927 |
| 2,189,129 | Bridwell | Feb. 6, 1940 |
| 2,629,393 | Langdon | Feb. 24, 1953 |
| 2,670,757 | Delany | Mar. 2, 1954 |
| 2,687,707 | O'Shei | Aug. 31, 1954 |
| 2,832,641 | Korda | Apr. 29, 1958 |